ULTRASONIC THICKNESS GAUGE

Filed March 21, 1955 2 Sheets-Sheet 1

June 2, 1959 E. A. HENRY 2,888,824

ULTRASONIC THICKNESS GAUGE

Filed March 21, 1955 2 Sheets-Sheet 2

United States Patent Office 2,888,824

Patented June 2, 1959

2,888,824

ULTRASONIC THICKNESS GAUGE

Elliott A. Henry, Newtown, Conn., assignor to Sperry Products, Inc., Danbury, Conn., a corporation of New York Application March 21, 1955, Serial No. 495,507

9 Claims. (Cl. 73—67.9)

This invention relates to the measurement of wall thickness of material where only one surface is available. This condition arises in the measurement of wall thickness of pipe, storage tanks, ships' hulls, and the like. Methods have been devised for measuring thickness under these conditions. The most effective methods involved ultrasonic techniques for the non-destructive gauging and inspecting of materials. Two basically different ultrasonic systems have heretofore been proposed, i.e., the resonant system which, theoretically at least, measures the fundamental or harmonic frequency of the part in the thickness mode; and the non-resonant system which depends upon the use of ultrasonic pulse echo ranging. Both of these ultrasonic systems as heretofore employed have limitations that have prevented their widespread use.

It is, therefore, the principal object of this invention to provide a gauging system which shall have the following characteristics:

(1) The desired dimensional information can be read on a direct calibrated meter with auxiliary or optional aural indication.

(2) Provision is made for measuring materials with different ultrasound velocities.

(3) High resolution and accuracy is obtained.

(4) There is high sensitivity to small variations.

(5) The system operates in a wide test range.

(6) The system is "fail safe," i.e., it indicates "no test" or "out of range," if such condition exists.

(7) The system employs an efficient critically damped transducer.

To acomplish the foregoing, applicant employs a system which comprises essentially a critically damped transducer that is mechanically driven and introduces a pulse of ultrasound into the part, a provision for selecting a predetermined number of reflections through the part, producing a voltage proportional to the elapsed time of the ultrasound reverberation, and indicating the voltage on a meter calibrated in thickness.

Further objects and advantages of this invention will become apparent in the following detailed description thereof.

In the accompanying drawings.

Figure 1:
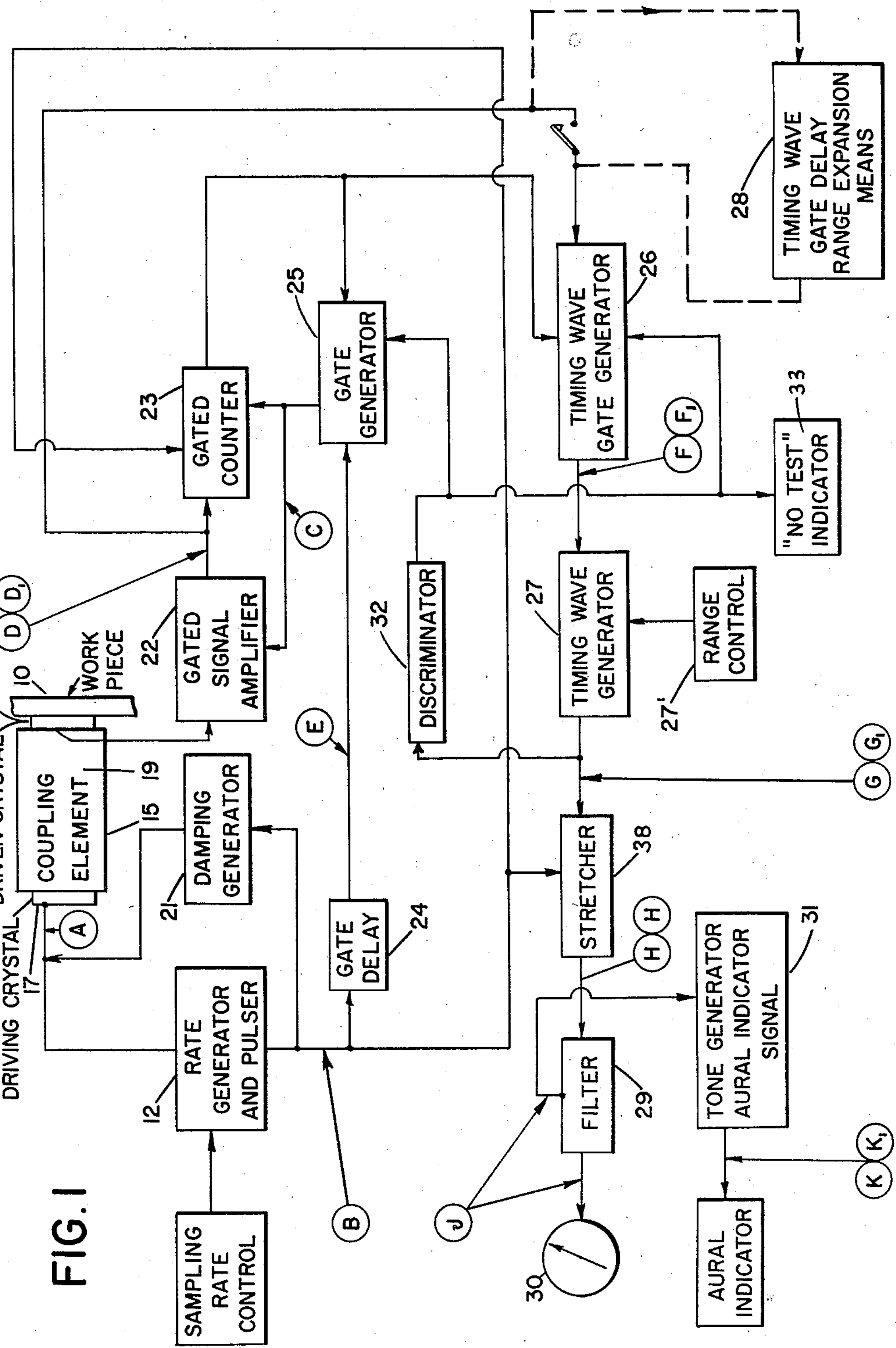
Fig. 1 is a diagrammatic representation in block form of one embodiment of this invention.
Figure 2:
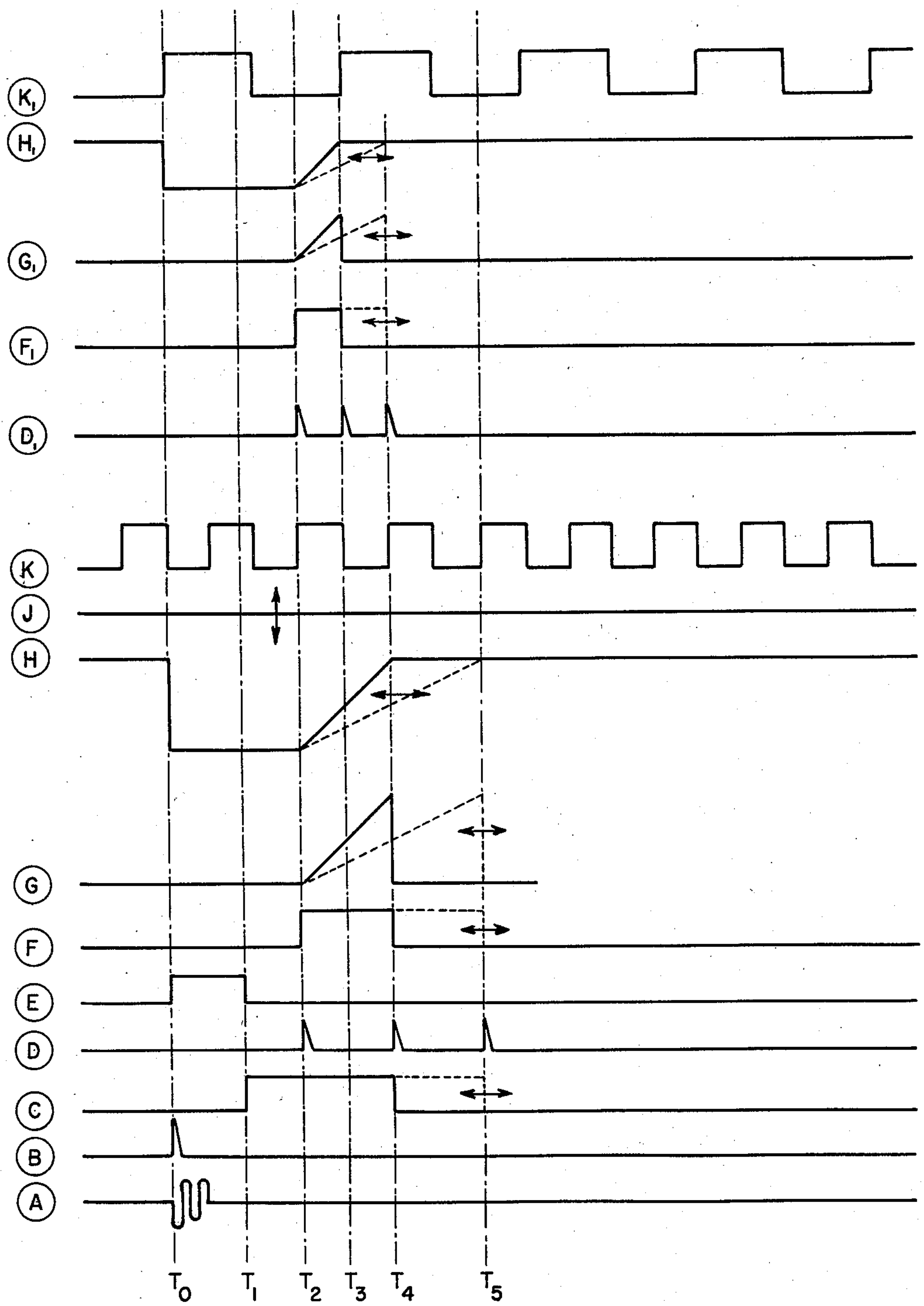
Fig. 2 is a wave form diagram, giving the time sequence of operation of the Fig. 1 device.

In Fig. 1, the letters contained in circles relate to the time sequence as disclosed in Fig. 2.

Referring to Fig. 1, there is shown an object 10 to be inspected. For the purpose of this invention, it is assumed that only one surface 11 of the object is accessible as in the case of a ship's hull, and that it is desired to measure the wall thickness of the object. For this purpose, there is provided a combined rate generator and RF pulser 12, whose pulse repetition rate is variable as by a manual control marked "Sampling Rate Control," and should be adjusted to a rate that permits all of the ultrasonic energy in the test piece 10 to be dissipated before application of the next sampling pulse. Sampling rates between 60 and 1000 p.p.s. are generally suitable.

The pulse is applied to a transducer indicated generally at 15 and which is especially suitable for the testing of thin sections. Transducers for ultrasonic inspection equipment usually consist of a single piezo-electric element, mechanically damped to a Q of 6 to 8 by a suitable backing material, to convert an electrical wave train into mechanical vibrations and to convert mechanical vibrations into an electrical wave train. A transducer of this type is usually coupled to the part to be inspected by a suitable couplant, such as oil, to transmit mechanical vibrations into the part and to receive any returned echo vibrations. This method is acceptable and reliable for part dimensions greater than one inch since the amplifier will have had sufficient time to recover from the shock of the initial drive pulse, whose amplitude is usually between 600 to 1000 peak volts, and the stretching of the echo by the transducer is of second order importance. Use of separate transducers for transmitting and receiving functions does not solve the problem for close to surface testing or thin section gauging, since the transducers do not search the same areas.

While the invention described herein may employ a single crystal for dimensional gauging in thicker sections, there is disclosed herein a transducer arrangement which is particularly designed for use on thin sections. For this purpose, the transducer is composed of two piezo-electric elements 17 and 18, separated by a material 19, capable of conducting ultrasound and of sufficient length so that the round trip time of the pulse therein is greater than the round trip time of the pulse in object 10. The two crystals are electrostatically shielded from each other. The driving crystal 17 whose natural frequency is the same as the test frequency, is connected to the pulse generator 12. Both the pulse generator oscillations and the driving crystal vibrations are terminated abruptly after a controlled number of cycles by electrical damping by means of a damping generator 21. A suitable damping generator is disclosed in U.S. Patent 2,562,450 to De Lano, owned by the assignee of the present invention. The driven crystal 18 is a periodic, i.e., it has a natural frequency much higher than the operating frequency and is therefore critically damped for operating frequency vibrations so that it will not overshoot or ring at the operating frequency. The driven crystal 18 is connected to the input of amplifier 22, and for transmitting conditions is mechanically driven by the driving crystal 17 through the coupling medium 19. By this arrangement, the amplifier 22 is not shocked by the driving electrical wave train, isolation between the transmitter and amplifier has been achieved while maintaining a scan area equal to a single crystal, and the returned echoes are not stretched so that the highest possible resolution is obtained. The only limitation for such a transducer is that the propagation time of the coupling element 19 must be greater than the propagation time of the test piece 10.

The pulse generator, simultaneously with generation of the pulse which is applied to transducer 17, generates a trigger which operates a gate delay multi-vibrator 24. The delayed trigger from gate delay 24 opens a gate generator 25. The gate delay 24 is set to open the gate after the pulse from pulse generator 12 has terminated and prior to the time of arrival of the pulse at the driven crystal 18, as $T_1$ in Fig. 2. The gate generator 25 sensitizes the signal amplifier 22 and the counter 23. The counter has previously been reset for zero count by the trigger generated by pulse generator 12 at time $T_0$. The pulse generated by generator 12 arrives at the driven crystal 18 at time $T_2$ which generates an electrical voltage and is coupled to the test piece 10. This generated voltage, or interface signal, is passed by the amplifier 22 and operates the counter 23, and at the same time the output of the counter starts a timing wave gate generator 26. With expanded operation, a delay multi-vibrator 28 may be used to delay the opening of the timing wave gate generator 26. The timing wave gate generator operates the timing wave generator 27 to generate a linear saw-tooth of voltage, the slope of which is controlled by the operator by range control 27' to set the test range and compensate for materials of various velocity constants. The timing wave generator 27 could be designed to produce a logarithmic response if increase in displayed dynamic range is desired. If the counter 23 is set for three counts (consisting of pulse B at $T_0$ and two round trips $T_2$ and $T_4$) of the pulse, as shown in Fig. 2, the second reflection will produce an output trigger that will close the gate generator 25 and the timing wave gate generator 26. Closing of gate generator 25 turns off the counter 23 and the signal amplifier 22. Therefore, no further reflections will be passed by the amplifier 22 or counted by the counter 23. Simultaneously, the voltage in the timing wave generator 27 will cease to rise and will return to its quiescent value (in this case, zero). The amplitude of the timing wave thus generated is proportional to the thickness of the part.

The timing wave thus generated as a function of the thickness of the part may be stretched by a stretcher 38. The stretched signal maintains a steady value equal to the peak voltage of the timing wave from time $T_4$ to $T_5$ when the stretcher 38 is reset to zero by a trigger from the pulse generator 12. As the duty cycle of the stretcher 38 will be approximately 95 to 98%, the voltage may be readily filtered by a low-pass filter 29, and the filtered output may be read on an indicator 30 such as a meter or other voltage sensitive device. In addition, an aural signal 31 may be provided whose frequency is proportional to thickness.

Provision is made for two conditions that can arise and which, if ignored, could block the system. These are: (1) no return echo, and (2) maximum range, set by slope control 27', for less than the thickness of the part. It is apparent that if no echo signal returns or arrives at a time after counter 23 has been closed, the timing wave voltage would continue to rise until a limiting condition, depending upon component values, is reached. This condition is avoided by providing a voltage discriminator 32 set to operate at 105% or 110% of the normal maxmum amplitude of the timing wave for full scale deflection of the indicator. The output from discriminator 32 will close gate generator 25 and timing wave gate generator 26 to restore normal sequence of operation and operate an indicator 33 to warn the operator.

While the device has been described as applied to determining wall thickness, it will be apparent that it can operate equally well to detect the presence of flaws or discontinuities within objects since such flaws are reflecting surfaces similar to the back surface of the object. Thus, this device will not only indicate the presence of a flaw but also the depth of the flaw or discontinuity beneath the surface. In the following claims, it will, therefore, be understood that the term "measurement of thickness" also refers to measurement of the depth of the flaw beneath the surface.

Having described my invention, what I claim and desire to secure by Letters Patent is:

1. Apparatus for ultrasonic measurement of the thickness dimension of relatively thin objects, comprising: a transducer assembly for coupling ultrasonic pulse energy into and out of one surface of an object, said assembly including a driving transducer, a driven tranducer and a coupling element therebetween having a round-trip ultrasonic propagation time which is greater than the round-trip ultrasonic propagation time in the object being measured, the natural frequency of said driven transducer being sufficiently greater than that of the driving transducer to render the driven transducer effective aperiodic at the natural frequency of the driving transducer, and the transducing axes of said transducers being in alignment with one another; a pulse generator, circuit means for applying electrical pulses from said generator, of the natural frequency of said driving transducer, periodically to said driving transducer at intervals greater than the one-way propagation time in said coupling element, electrical damping means connected to said circut means for suppressing vibration of said driving transducer upon the termination of each pulse, a signal amplifier connected to said driven transducer for energization thereby in response to ultrasonic stimulation of said driven transducer, gating means driven by said pulse generator and connected to said signal amplifier for opening the latter after the conclusion of each pulse applied to said driving transducer and before the arrival of such pulse at the driven transducer, means connected to said signal amplifier for counting the successive output pulses from said amplifier incident to the stimulation of said driven transducer by the direct pulse from said driving transducer and by its successive reflections from the opposite surface of said object, a timing wave generator for initiating a saw-tooth timing wave upon each energization thereof, means for energizing said timing wave generator upon the occurrence of the first output pulse from said amplifier, means controlled by said counting means for deenergizing said amplifier after a predetermined plurality of output pulses from said amplifier and for simultaneously terminating the output of said timing wave generator, and means for indicating the thickness of the object under test as a function of the amplitude reached by the timing wave generated during the energization period of said timing wave generator.

2. Apparatus for ultrasonic measurement of the thickness dimension of objects, comprising: a transducer assembly for coupling ultrasonic pulse energy into and out of one surface of an object, said assembly including a driving transducer, a driven transducer and a coupling element therebetween having a round-trip ultrasonic propagation time which is greater than the round-trip ultrasonic propagation time in the object being measured, the natural frequency of said driven transducer being sufficiently greater than that of the driving transducer to render the driven transducer effectively aperiodic at the natural frequency of the driving transducer, and the transducing axes of said transducers being in alignment with one another; a pulse generator, circuit means for applying electrical pulses from said generator, of the natural frequency of said driving transducer, periodically to said driving transducer at intervals greater than the one-way propagation time in said coupling element, electrical damping means connected to said circuit means for suppressing vibration of said driving transducer upon the termination of each pulse, a signal amplifier connected to said driven transducer for energization thereby in response to ultrasonic stimulation of said driven transducer, gating means driven by said pulse generator and connected to said signal amplifier for opening the latter after the conclusion of each pulse applied to said driving transducer and before the arrival of such pulse at the driven transducer, means connected to said signal amplifier for counting the successive output pulses from said amplifier incident to the stimulation of said driven transducer by the direct pulse from said driving transducer and by its successive reflections from the opposite surface of said object, timing means, and means for operating said timing means under control of said counting means to indicate the thickness of the object as a function of the time duration occupied by a pre-selected plurality of amplifier output pulses.

3. Apparatus in accordance with claim 2, including means for resetting said counting means to a zero count registration upon each initiation of the said pulse generator for applying electrical pulses to said driving transducer.

4. Apparatus in accordance with claim 2, including range-limit sensing means connected for control by said timing means and responsive to the production by said timing means of a thickness indication exceeding a predetermined maximum desired measuring range, for terminating the operation of said timing means; and operator signal warning means energized from said range-limit sensing means.

5. Apparatus in accordance with claim 2, including manually operable adjusting means for adjusting said timing means to control the scale factor relationship between the duration of the selected output pulse series of said amplifier and the magnitude of the thickness indication.

6. Apparatus for ultrasonic measurement of the distance between an entry face of an object and a reflective discontinuity thereof, comprising: a transducer assembly for coupling ultrasonic pulse energy into and out of said entry face of the object, said assembly including a driving transducer, a driven transducer and a coupling element therebetween having a round-trip ultrasonic propagation time which is greater than the round-trip ultrasonic propagation time in the object between its entry face and said discontinuity, the natural frequency of said driven transducer being sufficiently different from that of the driving transducer to render the driven transducer effectively aperiodic at the natural frequency of the driving transducer, and the transducing axes of said transducers being in alignment with one another; a pulse generator, circuit means for applying electrical pulses from said generator, of the natural frequency of said driving transducer, periodically to said driving transducer at intervals greater than the one-way propagation time in said coupling element, electrical damping means connected to said circuit means for suppressing vibration of said driving transducer upon the termination of each pulse, a signal amplifier connected to said driven transducer for energization thereby in response to ultrasonic stimulation of said driven transducer, gating means driven by said pulse generator and connected to said signal amplifier for opening the latter after the conclusion of each pulse applied to said driving transducer and before the arrival of such pulse at the driven transducer, means connected to said signal amplifier for counting the successive output pulses from said amplifier incident to the stimulation of said driven transducer by the direct pulse from said driving transducer and by its successive reflections from the discontinuity of said object, a timing wave generator for initiating a timing wave of progressively changing amplitude upon each energization thereof, means connected to said signal amplifier for energizing said timing wave generator upon the occurrence of the first output pulse from said amplifier, means controlled by said counting means for deenergizing said amplifier after a predetermined plurality of output pulses from said amplifier and for simultaneously terminating the output of said timing wave generator, and means for indicating the desired distance in the object under test as a function of the amplitude reached by the timing wave generated during the energization period of said timing wave generator.

7. Apparatus for ultrasonic measurement of the thickness dimension of relatively thin objects, comprising: a transducer assembly for coupling ultrasonic pulse energy into and out of one surface of an object, said assembly including a driving transducer, a driven transducer and a coupling element therebetween having a round-trip ultrasonic propagation time which is greater than the round-trip ultrasonic propagation time in the object being measured, the natural frequency of said driven transducer being sufficiently greater than that of the driving transducer to render the driven transducer effectively aperiodic at the natural frequency of the driving transducer, and the transducing axes of said transducers being in alignment with one another; a pulse generator, circuit means for applying electrical pulses from said generator, of the natural frequency of said driving transducer, periodically to said driving transducer at intervals greater than the one-way propagation time in said coupling element, electrical damping means connected to said circuit means for suppressing vibration of said driving transducer upon the termination of each pulse, a signal amplifier connected to said driven transducer for energization thereby in response to ultrasonic stimulation of said driven transducer, gating means driven by said pulse generator and connected to said signal amplifier for opening the latter after the conclusion of each pulse applied to said driving transducer and before the arrival of such pulse at the driven transducer, means connected to said signal amplifier for counting the successive output pulses from said amplifier incident to the stimulation of said driven transducer by the direct pulse train from said driving transducer and by its successive reflections from the opposite surface of said object, a timing wave generator for initiating a time-dependent timing wave upon each energization thereof, means connected to said signal amplifier for energizing said timing wave generator upon the occurrence of the first output pulse from said amplifier, means controlled by said counting means for deenergizing said amplifier after a predetermined plurality of output pulses from said amplifier and for simultaneously terminating the output of said timing wave generator, and means for indicating the thickness of the object under test as a function of the time interval manifested by the timing wave generator at the end of the energization period thereof.

8. A combined transmitting and receiving transducer assembly for the inspection of objects by ultrasonic energy, characterized by good distance resolution of echo pulses produced within the object and by a minimal effective scan area, said assembly comprising a transmitting transducer and a receiving transducer arranged on a common axis relative to their effective transmitting and receiving axes, and an acoustic wave coupling element disposed between and coupled to said transducers, the coupling element having a propagation time which is greater than the propagation time corresponding to the shortest distance from which echoes are to be received from within the object to be inspected, and the natural resonant frequencies of said transducers being sufficiently different as to ensure that the receiving transducer will be effectively aperiodic at the natural resonant frequency of said transmitting transducer.

9. A transducer assembly in accordance with claim 8, in which said transducers are piezoelectric crystals.

References Cited in the file of this patent

UNITED STATES PATENTS

| | | |
|---|---|---|
| 2,499,520 | Modlowski et al. | Mar. 7, 1950 |
| 2,505,515 | Arenberg | Apr. 25, 1950 |
| 2,513,988 | Wolff et al. | July 4, 1950 |
| 2,562,449 | De Lano | July 31, 1951 |
| 2,672,392 | Caples et al. | Mar. 16, 1954 |
| 2,711,532 | Slusser | June 21, 1955 |